United States Patent [19]

Chen

[11] Patent Number: 4,932,710
[45] Date of Patent: Jun. 12, 1990

[54] SHADE SCREEN FOR THE WINDOWS OF MOTOR VEHICLES

[76] Inventor: Ing-Wen Chen, No. 3, Lane 57, Min-Tzu Road, Hsin-Chu City, Taiwan

[21] Appl. No.: 428,616

[22] Filed: Oct. 30, 1989

Related U.S. Application Data

[63] Continuation-in-part of Ser. No. 257,093, Oct. 13, 1988, abandoned.

[51] Int. Cl.$^5$ .............................................. E06B 9/00
[52] U.S. Cl. .................... 296/97.3; 296/97.8; 296/152; 160/107; 160/172; 160/176.1; 160/370.2; 160/37
[58] Field of Search ............ 160/107, 172, 176.1, 160/168.1, 370.2, 34, 173, 130, 166.1, 105, 37; 296/97.2, 97.8, 97.9, 97.1, 97.3, 97.4, 152

[56] References Cited

U.S. PATENT DOCUMENTS

| | | | |
|---|---|---|---|
| 1,661,709 | 3/1928 | Tate | 160/172 X |
| 1,687,092 | 10/1928 | Hough | 160/176.1 |
| 1,791,831 | 2/1931 | Nelson | 160/168.1 |
| 2,116,961 | 5/1938 | Buell | 160/172 |
| 2,165,669 | 7/1939 | Wade | 160/176.1 |
| 2,234,804 | 3/1941 | Murray | 160/176.1 X |
| 2,707,993 | 5/1955 | Null | 160/168.1 |
| 3,033,282 | 5/1962 | Quarve | 160/176.1 |
| 3,126,052 | 3/1964 | Tonnon | 160/370.2 X |
| 3,389,737 | 6/1968 | Arnold et al. | 160/176.1 X |
| 3,845,803 | 11/1974 | Horst et al. | 160/172 |
| 4,081,937 | 4/1978 | Koch | 296/97.1 X |
| 4,638,166 | 1/1987 | Baudro | 160/130 X |

Primary Examiner—David M. Purol
Attorney, Agent, or Firm—Leonard Bloom

[57] ABSTRACT

A window shade screen is disclosed in combination with the window of a motor vehicle. The screen includes horizontal slats and a tilt plate positioned thereabove. An assembly for associating the tilt plate with the slats is provided, so that tilting of the tilt plate tilts the slats concomitantly therewith. An assembly is also provided for removably securing the tilt plate to the window, so that the screen moves upwardly and downwardly with the window. An assembly is further provided for securing the slats to the tilt plate. Finally, a chamber is provided for receiving all the components of the screen when the screen is not in use.

16 Claims, 4 Drawing Sheets

FIG-8 ial application Ser. No. 257,093 filed Oct. 13,
SHADE SCREEN FOR THE WINDOWS OF MOTOR VEHICLES

CROSS-REFERENCE TO RELATED APPLICATION

The present application is a continuation-in-part of U.S. patent application Ser. No. 257,093 filed Oct. 13, 1988, now abandoned, the contents of which are hereby incorporated herein in their entirety.

FIELD OF THE INVENTION

The present invention relates to shade screens and, in particular to shade screens for the windows of motor vehicles.

BACKGROUND OF THE INVENTION

Many windows of motor vehicles have a trapezoidal configuration, including an oblique edge. Accordingly, such windows are often narrower in the upper portions thereof and wider in the lower portions thereof. Due to this shape, conventional shade screens for such windows (which are often square or rectangular shape, without any oblique edges) are limited in their width and are often unable to effectively block sunshine entering through the lower, wider portions of the window.

Also, many conventional shade screens are designed so as to be attached to and stored on or above the upper portion of the vehicle window. In such arrangements, the shade screens are pulled downwardly, from top to bottom, for placement in use. These arrangements are problematic for several reasons, especially when lowering and use of the window is desired.

First, when the shade screen is attached above the window, it can not accompany the movement of the window. Thus, when the window is partially or wholly lowered for use with the shade extended, the free flow of air through the window is blocked as is the ability for one to extend their hand, arm or head out of the window.

Second, when the shade screen is attached to the window, so as to accompany the movement of the window, then partially or wholly lowering the window with the shade extended results in the shade "bunching-up" at the lower portion thereof.

Thus, in each of the above cases, to use the window, the shade screen must first be fully retracted before the window may be partially or wholly lowered—a situation which may not always be possible due to time and/or driver constraints.

Third, when the shade screen is attached to the window, its presence prevents the window from being fully lowered. Such a situation is not satisfactory.

Fourth, when the shade screen is attached above the window, even when the screen is retracted and stored, it nonetheless provides an obstacle to the free and unhindered use of the opened window.

Thus, it can be seen that there remains a need for a shade screen for the window of motor vehicles which is shaped so as to approximate the trapezoidal shape of a conventional motor vehicle window, which shade screen is not fixed either above or to the window and which is capable of accompanying the movement of the window when it is raised and lowered.

SUMMARY OF THE INVENTION

The object of the present invention is to provide a shade screen for the window of a motor vehicle, which screen is trapezoidal in shape, including an oblique edge, so as to substantially approximate the configuration of a conventional motor vehicle window and which screen is fixed below the window and which accompanies the movement of the window when it is raised and lowered.

A further object of the present invention is to provide such a shade screen which, when extended for use, is pulled upwardly and which is removably carried by the upper portion of the window, so as to accompany the movement of the window when it is raised or lowered.

In accordance with the teachings of the present invention there is disclosed a window shade screen for use in combination with the window of a motor vehicle. This screen includes a plurality of substantially parallel horizontal slats. A tilt plate is positioned above the horizontal slats. Means for associating the tilt plate with the slats is provided, so that selective tilting of the tilt plate tilts the slats concomitantly therewith. Means is provided for removably securing the tilt plate to the window of a motor vehicle. In this fashion, the tilt plate is supported by the window for movement therewith. Means for securing the slats to the tilt plate is also provided so that the slats are supported in position. A chamber is secured to the motor vehicle for removably receiving therein the slats, tilt plate, means for associating the tilt plate with the slats, the means for removably securing the tilt plate to the window and the means for securing the slats to the tilt plate. In this fashion, all of the elements of the screen may be selectively removed from the window and moved downwardly along the window for storage in the chamber when the screen is not in use. Also in this fashion, when the use of the screen is desired, the screen and all the elements thereof may be removed from the chamber being moved upwardly along the window and be removably secured to the window.

Preferably, each of the slats has a first end and a second end. The slats are positioned with each of the first ends of the slats being aligned along a substantially vertical axis following a substantially vertical edge of the window. Each of the second ends of the slats are aligned along a substantially oblique axis following a substantially oblique edge of the window.

In a preferred embodiment, the means for removably securing the tilt plate to the window includes a pair of hangers and a pair of screw bolts. Each of the hangers are positioned at a respective end of the tilt plate. Each of the hangers includes a lower wall and an upper hooking portion that is removably hooked and secured to the window, so that the window supports the hanger. The screw bolts have a first and a second end. Each screw bolt is disposed through and is carried by a respective lower wall of a respective hanger. Disposed thusly, the first end of each bolt is positioned on one side of the wall away from the tilt plate and the second end is positioned on the other side of the wall secured to a respective end of the tilt plate. In this fashion, the tilt plate, and the slats supported thereby, are supported by the hangers and the window.

In a preferred alternative embodiment, the means for removably securing the tilt plate to the window includes a pair of hangers and a pair of suction cups. Each of the hangers are positioned at a respective end of the tilt plate. Each of the hangers has at least one of the suction cups secured thereto. The suction cups removably secure the hangers and the tilt plates to the window, so that the window supports the hangers and the tilt plate.

In another preferred alternative embodiment, the means for removably securing the tilt plate to the window includes a hanger plate and a tilt adjustment means. The hanger plate is carried by the tilt plate and includes at least one hanger, having an upper hooking portion, thereon. This upper hooking portion removably hooks and secures the hanger plate to the window, so that the window supports the hanger and the hanger plate. The tilt adjustment means includes a tilt adjustment string, a spring and a housing. The string has a first end that is joined to the hanger plate and a second opposite end. The spring has a first end that is joined to the tilt plate and a second end that is joined to the second end of the tilt adjustment string, so that the second end of the tilt adjustment string is constantly urged away from its first end. In this fashion, the tilt plate is constantly pulled upwardly. The housing has a fixed block and a movably block housed therein. The movable block is constantly urged by, for example, a spring, towards the fixed block. The tilt adjustment string is disposed extending through the housing, such that the string is clamped between the fixed and the movable blocks. Finally, means is provided for moving the movable block away from the fixed block for selectively clamping and unclamping the string, so that manual adjustment of the tilt plate may be effected.

These and other objects and advantages of the present invention will become apparent from a reading of the following specification, taken in conjunction with the enclosed drawings.

DESCRIPTION OF THE PREFERRED EMBODIMENT

Referring now to the drawings, the shade screen 1 of the present invention includes a storage chamber 10 for receiving and storing the screen 1, a set of slats 20 and a manually-actuatable tilt device 30.

The chamber 10 is firmly secured below the window C, such as on a lower edge of a window frame of a door A and B of a motor vehicle. The chamber 10 may be secured to the door by any suitable means, such as screws, double-face tape, etc.

The chamber 10 is equipped with a movable cover 11 for providing access to the interior thereof. This access permits one to remove, wholly or partially, the shade screen 1 from the chamber 10 for the use thereof. This access further permits one to place, either wholly or partially, the screen 1 in the chamber for the storage thereof.

Figure 1:
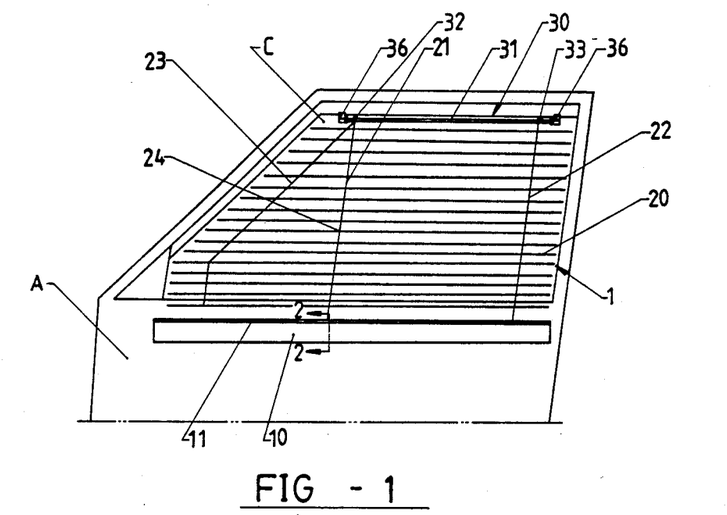
FIG. 1 is a front view of the shade screen of the present invention installed on the window of a front door of a motor vehicle.
Figure 2:
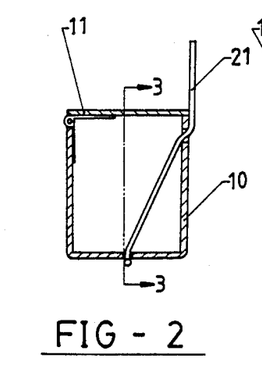
FIG. 2 is a cross-section view taken along lines 2—2 of FIG. 1.
Figure 3:
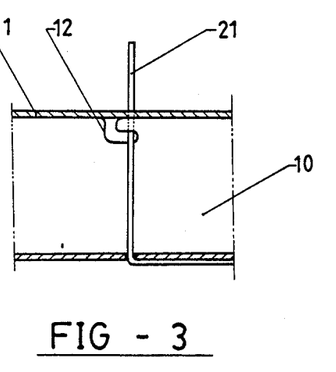
FIG. 3 is a cross-section view taken along lines 3—3 of FIG. 2.
Figure 5:
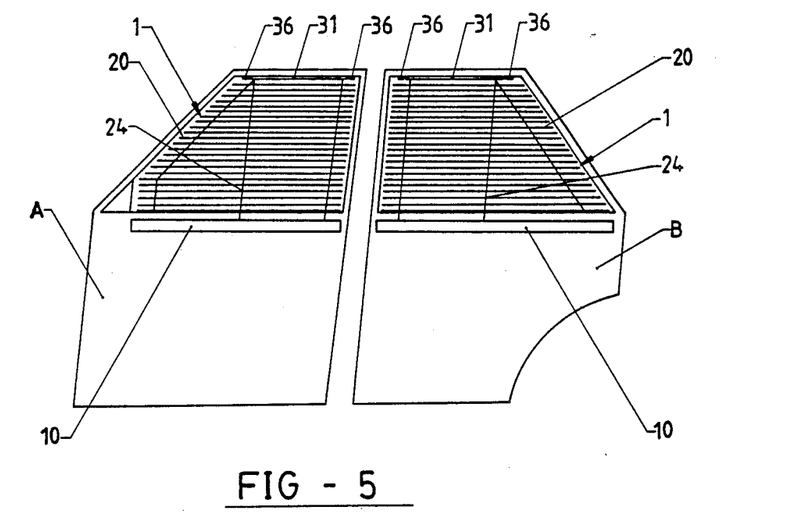
FIG. 5 is a front view of shade screens of the present invention installed on the windows of both a front door and back door of a motor vehicle.

Referring in particular now to FIGS. 2 and 3, in addition to FIGS. 1 and 5, a pair of spaced-apart "L-shaped" openings 12 are formed in the side wall of the chamber 10 that is adjacent to the vehicle door A (or B). Elastic leading string portions 21 and 22 are received through respective openings 12 for aiding in raising and lowering the slats 20, as shall be discussed at length herein. Preferably, the bottoms (lower portions) of the leading string portions 21 and 22 are received in the chamber 10 through respective "L-shaped" openings 12 of the chamber 10. These leading string portions 21 and 22 then pass through the chamber and emerge through the bottom wall thereof where they may either be joined with one another (so as to comprise a single string) or they may be secured to the bottom (i.e., to the bottom wall) of the chamber 10 (so as to comprise two separate strings). In either case, the leading string portions 21 and 22 ensure that the lower portion of the blind is maintained close to the window C when the shade screen 1 is extended into its open position during the use thereof.

Figure 4:
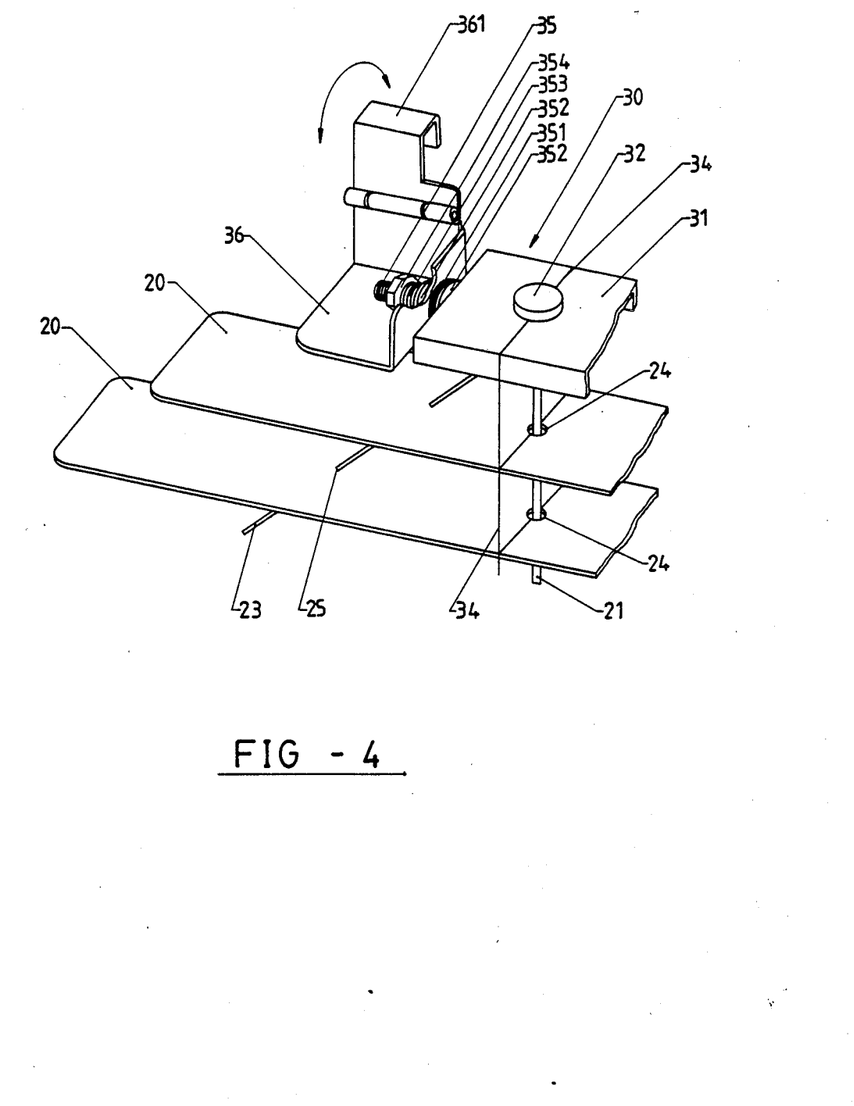
FIG. 4 is an enlarged perspective view of a part of the top portion of the window shade screen with parts removed therefrom for the sake of clarity.

Referring in particular now to FIG. 4, each of the slats 20 has a respective pair of spaced-apart apertures 24 formed therein for receiving therethrough the respective leading string portions 21 and 22.

The slats 20 are of varying lengths having respective first ends and second opposite ends. The respective first ends are substantially aligned with one another along a substantially vertical axis that follows the vertical line of the window C. The respective second ends are substantially aligned with one another along an oblique axis that follows the oblique line of the window C. Positioned thusly, the spaced-apart apertures 24 formed in the slats 20 are substantially vertically aligned with one another, so that the leading string portions 21 and 22 are received substantially vertically therethrough being substantially parallel with one another and with the substantially vertical axis that follows the vertical line of the window C.

Figures 7, 9:
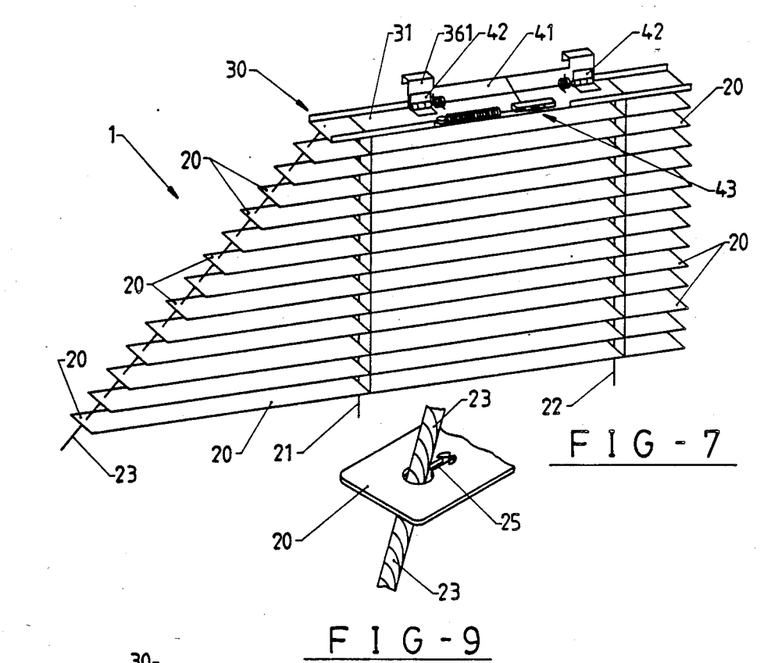
FIG. 7 is a perspective view of another embodiment of the shade screen of the present invention with the storage chamber removed therefrom for the sake of clarity.
FIG. 9 is a perspective view showing an alternative embodiment for the holes in the slats of the shade screen that receive the positioning string therethrough.

Referring now to FIG. 9, in addition to FIG. 4, each of the slats 20 further has an obliquely angled opening 25 formed therein. These openings 25 are located between the second ends of the slats 20 and the respective opening 24 of the same slots through which the leading string portion 21 is received. The distance between each of the oblique openings 25 and the respective second ends of the slats 20 is substantially identical from slat to slat 20, such that openings 25 are aligned with one another on an oblique axis that is substantially parallel to the oblique axis on which the second ends of the slats 20 are aligned.

Received through each of the oblique openings 25 is a length of positioning string 23. This positioning string 23 aids in stabilizing and maintaining the positioning of the individual slats 20 along the vertical and oblique lines of the window C when, during use, the shade 1 is in its extended open position. In this fashion, the shade screen 1 of the present invention substantially approximates the window and, thus provides a complete sunshine shielding or shading effect.

With reference now to FIG. 4, in one embodiment, the diameter of the positioning string 23 is slightly greater than the diameter of the oblique openings 25. In such an event, the string 23 has an elastic property that permits the string 23 to be stretched. This stretching results in a consequent reduction of the diameter of the string 23, so that the diameter of the stretched string 23 is less than the diameter of the holes 25. In this stretched state, the string 23 may be received through the oblique openings and the desired positioning of the slats 20 on the string 23, may be effected. Once this is completed, the tension on the string 23 may then be released, permitting the string 23 to return to its original diameter wherein the slats 20 are held in the desired position.

With reference now to FIG. 9, in a second, alternative embodiment, the oblique opening 25 formed in the slats 20 may be substantially "dumbbell" in shape with a larger open portion and a smaller open portion. The smaller open portion is, preferably provided with teeth or any other suitable means that aids in gripping and or retaining the string 23 in place. First, the string 23 is extended through the larger open portion so that the slat may be easily moved to its desired position on the string 23. The string 23 may then be moved into the smaller open portion where the string 23 is accommodated and held in place. In this fashion, the size of the opening 25 in relation to the string 23 as well as the teeth aid in holding and maintaining the slat 20 in position relative to the string 23.

Returning now to FIG. 4, in addition to FIGS. 1 and 5, the upper portion of the positioning string 23 and the upper portions of the leading string portions 21 and 22 are all secured to the tilt device 30.

The manually-actuatable tilt device 30 is provided for selectively and manually tilting the slats 20, so as to effect the most optional sunshine shielding effect possible. This device 30 includes a tilt plate 31 having an inverted U-shape. This tilt plate 31 is positioned above and is substantially parallel to the uppermost slat 20. The tilt plate 31 carries a pair of spaced-apart supporting plugs 32 and 33, each of which is located vertically aligned with a respective spaced-apart opening 24 formed in the slats 20 and a respective "L-shaped" opening 12 formed in the storage chamber 10. Supporting plug 32 (located near the second end of the slats 20) is secured to the uppermost end of positioning string 23 and the leading string portion 21. Supporting plug 33 (which is located near the first end of the slats 20) is secured to the uppermost end of the leading string portion 22. This arrangement maintains the leading string portions 21 and 22 in balance.

Plugs 32 and 33 are further equipped with respective strings 34 which extend substantially vertically downwardly therefrom. Strings 34 further surround the individual slats 20 and are secured thereto for, by manual movement of the tilt plate 31, permitting the slats 20 to be manually and selectively moved (tilted) in unison. Such an arrangement thereby not only maintains the slats 20 in line but also permits the slats 20 to be concomitantly moved (tilted) with the tilt plate 31.

With further reference now to FIG. 4, a respective screw bolt 35 is carried by each end (the first and second opposite ends) of the tilt plate 31. Each bolt 35 has respective first and second ends. Each respective bolt 35 carries thereon a rubber gasket 351, a pair of cushions 352, a spring 353 and a screw nut 354. The inclination of the plate 31 can be easily adjusted by hand and maintained in place due to the compressive force against the plate 31 provided by the gasket 351, the cushions 352, the spring 353 and the nut 354, as will be described.

A pair of spaced hangers 36 are provided. One of each of the spaced hangers 36 is positioned at a respective end (the first and second opposite ends) of the tilt plate 31. The first end of every bolt 35 is housed in and is carried by a respective hanger 36. The bolts 35 pass through the respective hangers 36 extending towards the plate 31. The second end of each bolt 35 is secured to a respective end of the plate 31. Located in between the respective hanger 36 and the plate 31 and carried on the second end of each of the bolts 35 outside of the hangers 36 are the gasket 351 and one of the cushions 352. Carried on the first end of each of the bolts 35 inside of the hangers 36 are the nut 354, the spring 353 and the other of the cushions 352. The springs 353 are positioned between the nut and the other of the cushions 352, so that the tilt plate 31 is constantly biased towards the hanger 36. In this fashion, the biasing action provided by the springs 353 ensures that a constant compressive force is maintained between the plate 31, the gasket 351, one of the cushions 352 and the hanger 36, so that the plate 31 may be maintained in the position desired (inclined or level) when so adjusted by hand.

Finally, each respective hanger 36 includes a pivotal top element (an upper hooking portion) 361. Element 361 is substantially hooked being inverted L-shaped and is used for hanging the shade screen 1 on the upper edge of the glass of the window C. Element 361 is pivotally secured to the remainder of the hanger 36 by a hinge or any other suitable means. The element 361 of every hanger 36 is formed as a thin metal sheet (having a thickness of, preferably 0.4–0.5 mm) capable of maintaining the slats 20 close to the window C, when the window is closed.

Figure 6:
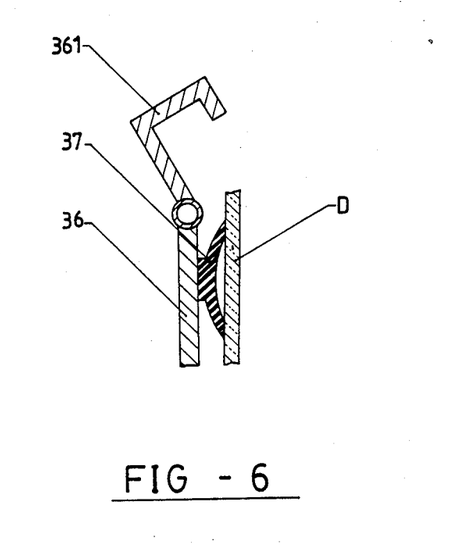
FIG. 6 is a cross-section view of the top portion of a shade screen showing an alternative means for removably securing the shade to a window of a motor vehicle.

Referring now to FIG. 6, an alternative embodiment of removably securing the shade 1 to a window C of a motor vehicle is illustrated. This embodiment finds particular application in cases where the window of the motor vehicle is not openable, such as in the case of the rear window D of a motor vehicle. In this embodiment, the device 30 can be firmly secured an the rear window D by use of a suction cup (sucker) 37 that is carried on the element 361 of every hanger 36, considering that the area of the rear window D of most vehicles are larger than the window B of the vehicles doors, the sunshine-shielding effect is shown as being maintained by the use of two sets of blinds disposed in a side-by-side arrangement on the rear window.

Figure 8:
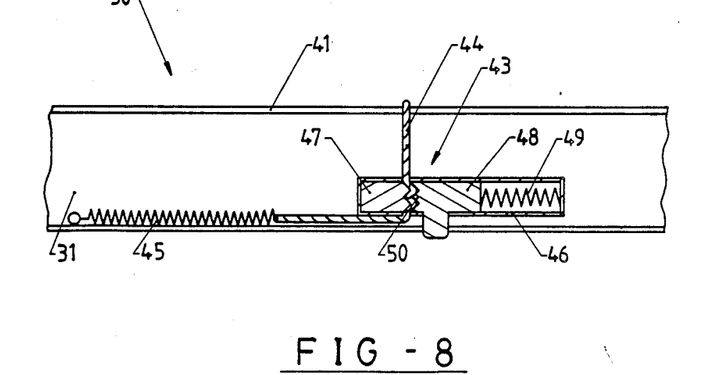
FIG. 8 is an overhead view of the tilt adjustment means of the embodiment of FIG. 7, with portions of the housing removed therefrom to show the positioning of the string, fixed block and movable block therein.

With reference now to FIGS. 7 and 8 another alternative embodiment of the shade 1 is illustrated. In this embodiment, the tilt plate 31 is substantially U-shaped and the individual hangers 36 with nuts 35 are omitted, and a hanger plate 41, including at least one upper hooking portion 361 being substituted in their place. This hanger plate 41 is pivotally secured to the center of the top of the plate 31 by a pair of leaf springs 42. The hanger plate 41 is then held in position by an adjusting means 43.

The adjusting means 43 includes a string 44 having a first end that is secured to the hanger plate 41 and a second opposite end. A spring 45 is provided having a first end that is secured to the tilt plate 31 and a second opposite end that is secured to the second opposite end of the string 44. In this manner, the second end of the string 44 is constantly biased away from the first end of the string 44, thereby constantly pulling the tilt plate upwardly. The adjusting means 43 includes a rectangular case 46. The string 44 extends through the case 46 where the string 44 passes between a fixed block 47 and a movable block 48 that is constantly biased against the fixed block 47 by a second spring 49. The fixed block 47 and the movable block 48 are both equipped with mating teeth 50 to aid in securingly clamping the string 45 therebetween.

Referring now generally to FIGS. 1-9, as described above, operation of the shade screen 1 can be easily accomplished. To use the screen 1 one needs simply to first remove the cover 11 from the chamber 10. The slats 20 and the tilt device 30 may then be pulled upwardly along the window C in order to allow the elements (hooking portions) 361 of the device 30 to be hooked and hung on the upper edge of the windows C. Hooked thusly, the shade screen 1 moves up and down concomitantly with the window C. When the window C is closed, the fully opened, stretched blind 1 fits the shape of the window C (See FIGS. 1 and 5) and sun-shielding effects thereof can be varied by placing the slats 20 in the desired position by using the string 23 and by tilting the slats 20 utilizing the tilt device 30.

When the window C is partially opened, the shade screen 1 will move downwardly therewith. As the shade screen 1 moves downwardly, the lowermost slats 20 of the screen 1 are progressively received in the chamber 10. In this fashion, the lowermost of the slats 20 do not bunch up or otherwise obstruct the user and the remainder of the slats 20 or the tilt device 31 do not, in any manner whatsoever, obstruct one's use of the window C.

In the case of dismantling the shade screen 1, the elements (hooking portions) 361 are simply unhooked from the window C and are moved downwardly along the window C. The slots 20 and the tilt device 30 are received in the chamber 10. The cover 11 may then be placed over the chamber 10, sealing it. It is noted that, stored thusly, the shade screen 1 has a suitable volume and does not occupy a large space or obstruct one's use of the window.

Following the above description, it will be understood by those skilled in the art that the major elements of the screen 1 can be manufactured utilizing different materials to meet the requirements of storage and strength and ability to effectively block the sunshine and its attendant heat.

Obviously, many modifications can be made without departing from the basic spirit of the present invention. Accordingly, it will be appreciated by those skilled in the art that, within the scope of the appended claims, the invention may be practiced other than has been specifically described herein.

What is claimed is:

1. A window shade screen in combination with the window of a motor vehicle, the combination comprising:

a plurality of substantially parallel horizontal slats;
a tilt plate positioned above the horizontal slats;
means for associating the tilt plate with the slats, whereby selective tilting of the tilt plate tilts the slats concomitantly therewith;
means for removably securing the tilt plate to the window of the motor vehicle, whereby the tilt plate is supported by the window for movement therewith;
means for securing the slats to the tilt plate, whereby the slats are supported in position; and
a chamber secured to the motor vehicle for removably receiving therein the slats, tilt plate, means for associating the tilt plate with the slats, means for removably securing the tilt plate to the window and the means for securing the slats to the tilt plate, such that all the said elements of the screen may be selectively removed from the window and moved downwardly along the window for storage in the chamber when the screen is not in use and further such that when use of the screen is desired, the screen and all the said elements thereof may be removed from the chamber being moved upwardly along the window and be removably secured to the window.

2. The window shade screen of claim 1, further comprised of the means for securing the slats to the tilt plate being further secured to the chamber, whereby the slats are maintained in position along the window.

3. The window shade screen of claim 1, further comprised of each of said slats having a first end and a second end, each of the first ends of the slats being aligned along a substantially vertical axis following a substantially vertical edge of the window, and each of the second ends of the slats being aligned along a substantially oblique axis following a substantially oblique edge of the window.

4. The window shade screen of claim 1, wherein the means for associating the tilt plate with the slats is comprised of a pair of spaced strings, each of said strings being secured to and extending substantially downwardly from the tilt plate and surrounding each of the slats, such that the strings are associated with each of the slats, whereby tilting of the tilt plate concomitantly tilts each of the slats therewith and further whereby each of the slats are maintained in the selected tilted position.

5. The window shade screen of claim 1, wherein the means for removably securing the tilt plate to the window is comprised of:

a pair of hangers, each of said hangers being positioned at a respective end of the tilt plate, each of said hangers having an upper hooking portion for removably hooking and securing the hanger to the window so that the window supports said hanger and each of said hanger further having a lower wall; and
a pair of screw bolts, each of said screw bolts having a first end and a second end, each screw bolt being disposed through and carried by a respective lower wall of a respective hanger with the first end being positioned on one side of the wall away from the tilt plate and with the second end being positioned on the other side of the wall secured to a respective end of the tilt plate, such that the tilt plate and the slats supported thereby are, in turn, supported by the hangers and the window.

6. The window shade screen of claim 5, wherein the upper hooking portions of the hangers are substantially L-inverted in shape.

7. The window shade screen of claim 5, wherein the means for removably securing the tilt plate to the window is further comprised of a gasket and a cushion being positioned on each respective screw bolt between the lower wall of the hanger and the tilt plate, such that a compressive force is provided therebetween for maintaining the tilt plate in the selectively desired inclined position.

8. The window shade screen of claim 7, wherein the means for removably securing the tilt plate to the window is further comprised of:
   a nut positioned on each respective first end of the screw bolts; and
   a respective spring positioned between each of the nuts and the lower wall of the hangers, such that a constant biasing action is provided for maintaining and insuring the compressive force between the tilt plate and the hangers, so that the tilt plate is maintained in the selectively desired inclined position.

9. The window shade screen of claim 1, wherein the means for securing the slats to the tilt plate is comprised of a pair of spaced strings, each of said strings being secured to and extending substantially downwardly from the tilt plate surrounding each of the slats and being joined thereto, whereby the slats are secured to and supported by the tilt plate.

10. The window shade screen of claim 1, further comprised of:
   each of the slats having a pair of spaced openings formed therein, one of each pair of openings being aligned with respective openings formed in the slats adjacent thereto, such that a pair of rows of aligned openings are defined;
   a pair of spaced strings, each of said strings having an upper end secured to and extending downwardly from the tilt plate through a respective row of aligned apertures defined in the slats, whereby the slats are maintained in horizontal alignment with one another; and
   each of said strings further having a second end being secured in the chamber.

11. The window shade screen of claim 1, wherein the means for securing the slats to the tilt plate is comprised of:
   each of the slats having an oblique opening of a first diameter formed therein, each of said oblique openings being positioned along an oblique axis; and
   an elastic string having a second diameter being larger than the first diameter of the oblique openings, said elastic string having an upper end secured to and extending downwardly from the tilt plate through the aligned oblique openings, said elastic string being stretched such that its diameter is less than the first diameter for insertion through the oblique openings and subsequently being released to resume its original second diameter, whereby the slats are, in turn supported by the elastic string and the tilt plate.

12. The window shade screen of claim 1, wherein the means for removably securing the tilt plate to the window is comprised of a pair of hangers, each of said hangers being positioned at a respective end of the tilt plate, each of said hangers further having at least one suction cup secured thereto for removably securing the hanger and the tilt plate to the window, so that the window supports said hangers and tilt plate.

13. The window shade screen of claim 1, wherein the means for removably securing the tilt plate to the window is comprised of:
   a hanger plate carried by the tilt plate, the hanger plate including at least one hanger having an upper hooking portion for removably hooking and securing the hanger plate to the window, so that the window supports the hanger and the hanger plate; and
   a tilt adjustment means for adjusting the tilt of the tilt plate, said tilt adjustment means including a tilt adjustment string having a first end joined to the hanger plate and a second opposite end, the tilt adjustment means further including a spring having a first end joined to the tilt plate and a second end joined to the second end of the tilt adjustment string, so that the second end of the tilt adjustment string is constantly urged away from the first end thereof, thereby constantly pulling the tilt plate upwardly, a housing having a fixed block housed therein and further having a movable block housed therein, said movable block being constantly urged towards the fixed block, the tilt adjustment string being disposed extending through the housing, such that the tilt adjustment string is clamped between the fixed and movable blocks, and means for moving the movable block away from the fixed block for selectively clamping and unclamping the tilt adjustment string, so that manual adjustment of the tilt plate may be effected.

14. A window shade screen in combination with the window of a motor vehicle, the combination comprising:
   a plurality of substantially parallel horizontal slats;
   a tilt plate positioned above the horizontal slats;
   means for associating the tilt plate with the slats, whereby selective tilting of the tilt plate tilts the slats concomitantly therewith;
   means for removably securing the tilt plate to the window of the motor vehicle, whereby the tilt plate is supported by the window for movement therewith;
   means for securing the slats to the tilt plate, whereby the slats are supported in position; and
   a chamber secured to the motor vehicle for removably receiving therein the slats, tilt plate, means for associating the tilt plate with the slats, means for removably securing the tilt plate to the window and the means for securing the slats to the tilt plate, such that all the said elements of the screen may be selectively removed from the window and moved downwardly along the window for storage in the chamber when the screen is not in use and further such that when use of the screen is desired, the screen and all the said elements thereof may be removed from the chamber being moved upwardly along the window and be removably secured to the window;
   each of said slats having a first end and a second end, each of the first ends of the slats being aligned along a substantially vertical axis following a substantially vertical edge of the window, and each of the second ends of the slats being aligned along a substantially oblique axis following a substantially oblique edge of the window; and
   wherein the means for removably securing the tilt plate to the window includes a pair of hangers, each of said hangers being positioned at a respective end of the tilt plate, each of said hangers having an upper hooking portion for removably hooking and securing the hanger to the window so that the window supports said hanger and each of said hanger further having a lower wall; and a pair of screw bolts, each of said screw bolts having a first end and a second end, each screw bolt being disposed through and carried by a respective lower wall of a respective hanger with the first end being positioned on one side of the wall away from the tilt plate and with the second end being positioned on the other side of the wall secured to a respective end of the tilt plate, such that the tilt plate and the slats supported thereby are, in turn, supported by the hangers and the window.

15. A window shade screen in combination with the window of a motor vehicle, the combination comprising:

a plurality of substantially parallel horizontal slats;

a tilt plate positioned above the horizontal slats;

means for associating the tilt plate with the slats, whereby selective tilting of the tilt plate tilts the slats concomitantly therewith;

means for removably securing the tilt plate to the window of the motor vehicle, whereby the tilt plate is supported by the window for movement therewith;

means for securing the slats to the tilt plate, whereby the slats are supported in position;

a chamber secured to the motor vehicle for removably receiving therein the slats, tilt plate, means for associating the tilt plate with the slats, means for removably securing the tilt plate to the window and the means for securing the slats to the tilt plate, such that all the said elements of the screen may be selectively removed from the window and moved downwardly along the window for storage in the chamber when the screen is not in use and further such that when use of the screen is desired, the screen and all the said elements thereof may be removed from the chamber being moved upwardly along the window and be removably secured to the window;

each of said slats having a first end and a second end, each of the first ends of the slats being aligned along a substantially vertical axis following a substantially vertical edge of the window, and each of the second ends of the slats being aligned along a substantially oblique axis following a substantially oblique edge of the window; and wherein the means for removably securing the tilt plate to the window includes a pair of hangers, each of said hangers being positioned at a respective end of the tilt plate, each of said hangers further having at least one suction cup secured thereto for removably securing the hanger and the tilt plate to the window, so that the window supports said hangers and tilt plate.

16. A window shade screen in combination with the window of a motor vehicle, the combination comprising:

a plurality of substantially parallel horizontal slats;

a tilt plate positioned above the horizontal slats;

means for associating the tilt plate with the slats, whereby selective tilting of the tilt plate tilts the slats concomitantly therewith;

means for removably securing the tilt plate to the window of the motor vehicle, whereby the tilt plate is supported by the window for movement therewith;

means for securing the slats to the tilt plate, whereby the slats are supported in position; and a chamber secured to the motor vehicle for removably receiving therein the slats, tilt plate, means for associating the tilt plate with the slats, means for removably securing the tilt plate to the window and the means for securing the slats to the tilt plate, such that all the said elements of the screen may be selectively removed from the window and moved downwardly along the window for storage in the chamber when the screen is not in use and further such that when use of the screen is desired, the screen and all the said elements thereof may be removed from the chamber being moved upwardly along the window and be removably secured to the window;

each of said slats having a first end and a second end, each of the first ends of the slats being aligned along a substantially vertical axis following a substantially vertical edge of the window, and each of the second ends of the slats being aligned along a substantially oblique axis following a substantially oblique edge of the window; and wherein the means for removably securing the tilt plate to the window includes a hanger plate carried by the tilt plate, the hanger plate including at least one hanger having an upper hooking portion for removably hooking and securing the hanger plate to the window, so that the window supports the hanger and the hanger plate, a tilt adjustment means for adjusting the tilt of the tilt plate, said tilt adjustment means including a tilt adjustment string having a first end joined to the hanger plate and a second opposite end, the tilt adjustment means further including a spring having a first end joined to the tilt plate and a second end joined to the second end of the tilt adjustment string, so that the second end of the tilt adjustment string is constantly urged away from the first end thereof, thereby constantly pulling the tilt plate upwardly, a housing having a fixed block housed therein and further having a movable block housed therein, said movable block being constantly urged towards the fixed block, the tilt adjustment string being disposed extending through the housing between the fixed and movable blocks, whereby the tilt adjustment string may be clamped therebetween and means for moving the movable block away from the fixed block for selectively unclamping the tilt adjustment string, so that manual adjustment of the tilt plate may be effected.

* * * * *